US012683183B2

(12) United States Patent
Nishida et al.

(10) Patent No.: US 12,683,183 B2
(45) Date of Patent: Jul. 14, 2026

(54) SECONDARY BATTERY

(71) Applicant: PRIME PLANET ENERGY & SOLUTIONS, INC., Tokyo (JP)

(72) Inventors: Akira Nishida, Himeji (JP); Toshihide Fukae, Kakogawa (JP); Shinji Iida, Toyota (JP); Ikuto Kobayashi, Toyota (JP)

(73) Assignee: PRIME PLANET ENERGY & SOLUTIONS, INC., Tokyo (JP)

( * ) Notice: Subject to any disclaimer, the term of this patent is extended or adjusted under 35 U.S.C. 154(b) by 513 days.

(21) Appl. No.: 18/175,600

(22) Filed: Feb. 28, 2023

(65) Prior Publication Data

US 2023/0290990 A1 Sep. 14, 2023

(30) Foreign Application Priority Data

Mar. 11, 2022 (JP) ................................. 2022-038035

(51) Int. Cl.
 *H01M 10/0587* (2010.01)
 *H01M 10/04* (2006.01)
 (Continued)
(52) U.S. Cl.
 CPC ................................ *H01M 10/0409* (2013.01)
(58) Field of Classification Search
 CPC ......... H01M 10/0409; H01M 10/0587; H01M 10/0431; H01M 10/4235; H01M 10/0525;
 (Continued)

(56) References Cited

U.S. PATENT DOCUMENTS

| 2,646,455 A | 7/1953 | Jeannin |
| 2003/0162088 A1 | 8/2003 | Nakanishi et al. |

(Continued)

FOREIGN PATENT DOCUMENTS

| CN | 105765766 A | 7/2016 |
| EP | 2 426 752 A2 | 3/2012 |

(Continued)

OTHER PUBLICATIONS

JP-2015103479-A Translation (Year: 2015).*

(Continued)

*Primary Examiner* — Matthew T Martin
*Assistant Examiner* — Kevin Song
(74) *Attorney, Agent, or Firm* — Finnegan, Henderson, Farabow, Garrett and Dunner, LLP

(57) ABSTRACT

According to the present disclosure, a secondary battery in which precipitation of metallic lithium can be inhibited more appropriately is provided. The secondary battery disclosed here includes a flat wound electrode body. The wound electrode body has a pair of curved portions and a flat portion. In addition, a positive electrode starting end portion inside the wound electrode body has a first region extending along the flat portion. On the other hand, a negative electrode starting end portion inside the wound electrode body has a second region extending along the flat portion, a folded portion folded back along a first curved portion, and a third region extending from the folded portion along the flat portion. In addition, in the wound electrode body, an electrode starting end stacked portion in which the first region, the second region, and the third region overlap each other is formed in a part of the flat portion, and a positive electrode terminating end portion and a negative electrode terminating end portion are disposed in the first curved portion. According to such a configuration, a local pressing failure and (Continued)

non-uniform heat generation distribution can be appropriately prevented, and the precipitation of metallic lithium can be inhibited.

9 Claims, 3 Drawing Sheets

(51) Int. Cl.

| | |
|---|---|
| *H01M 10/0525* | (2010.01) |
| *H01M 50/586* | (2021.01) |
| *H01M 50/593* | (2021.01) |

(58) Field of Classification Search

CPC ............. H01M 50/586; H01M 50/593; H01M 50/461; Y02E 60/10; Y02P 70/50

See application file for complete search history.

(56) References Cited

U.S. PATENT DOCUMENTS

| | | | |
|---|---|---|---|
| 2011/0135991 | A1 | 6/2011 | Sato |
| 2012/0052341 | A1 | 3/2012 | Kim et al. |
| 2012/0058373 | A1 | 3/2012 | Morikawa et al. |
| 2012/0208056 | A1 | 8/2012 | Takagi et al. |
| 2013/0280568 | A1 | 10/2013 | Miyazaki et al. |
| 2014/0072849 | A1 | 3/2014 | Nitta et al. |
| 2015/0037637 | A1 | 2/2015 | Mun |
| 2016/0218343 | A1 | 7/2016 | Kim et al. |
| 2016/0293929 | A1 | 10/2016 | Kitaoka et al. |
| 2017/0162912 | A1 | 6/2017 | Ueno et al. |
| 2018/0062147 | A1 | 3/2018 | Onoda et al. |
| 2019/0319310 | A1 | 10/2019 | Jiang |
| 2019/0393558 | A1 | 12/2019 | Wang et al. |
| 2020/0144675 | A1 | 5/2020 | Terashima et al. |
| 2020/0185676 | A1 | 6/2020 | Lee et al. |
| 2021/0351441 | A1* | 11/2021 | Hosokawa ........ H01M 10/0525 |
| 2021/0376428 | A1* | 12/2021 | Liang ................ H01M 10/0525 |

FOREIGN PATENT DOCUMENTS

| | | | | | |
|---|---|---|---|---|---|
| EP | 3 716 387 | A1 | | 9/2020 | |
| GB | 715903 | A | | 9/1954 | |
| JP | 2004-311339 | A | | 11/2004 | |
| JP | 2008-186708 | A | | 8/2008 | |
| JP | 2009-211949 | A | | 9/2009 | |
| JP | 2011-138762 | A | | 7/2011 | |
| JP | 2012-204243 | A | | 10/2012 | |
| JP | 2013-073787 | A | | 4/2013 | |
| JP | 2013-239433 | A | | 11/2013 | |
| JP | 2014-056742 | A | | 3/2014 | |
| JP | 2015103479 | A | * | 6/2015 | ........ H01M 10/0525 |
| JP | 2016-072247 | A | | 5/2016 | |
| JP | 2016-103361 | A | | 6/2016 | |
| JP | 2016-189247 | A | | 11/2016 | |
| JP | 2017-112055 | A | | 6/2017 | |
| JP | 2018-032575 | A | | 3/2018 | |
| JP | 2018-056162 | A | | 4/2018 | |
| JP | 2018-063816 | A | | 4/2018 | |
| JP | 2019-169353 | A | | 10/2019 | |
| JP | 2020-077492 | A | | 5/2020 | |
| WO | WO 2013/047515 | A1 | | 4/2013 | |
| WO | WO 2020/110975 | A1 | | 6/2020 | |

OTHER PUBLICATIONS

First Office Action in U.S. Appl. No. 17/676,821, dated Oct. 11, 2024.

Final Office Action issued in U.S. Appl. No. 17/676,821, dated Apr. 3, 2025.

Non Final Office Action issued in U.S. Appl. No. 17/676,821 on Sep. 25, 2025.

Final Office Action issued in U.S. Appl. No. 17/676,821 on Feb. 19, 2026.

* cited by examiner

SECONDARY BATTERY

CROSS REFERENCE TO RELATED APPLICATIONS

Priority is claimed on Japanese Patent Application No. 2022-38035, filed Mar. 11, 2022, the content of which is incorporated herein by reference.

BACKGROUND

1. Technical Field

The present disclosure relates to a secondary battery.

2. Description of the Related Art

A secondary battery such as a lithium ion secondary battery has an electrode body including a pair of electrode plates (a positive electrode plate and a negative electrode plate). As an example of such an electrode body, a wound electrode body in which elongated band-shaped positive and negative electrode plates are wound with a separator interposed therebetween can be exemplified. In such a wound electrode body, one end portions (starting end portions) of each electrode plate are disposed on an inner side of the electrode body, and the other end portions (terminating end portions) are disposed on an outer side of the electrode body. Further, an outer shape of this type of wound electrode body may be formed into a flat shape. The flat-shaped wound electrode body has a pair of curved portions each having a curved outer surface and a flat portion having a flat outer surface connecting the pair of curved portions.

Japanese Patent Application Publication 2019-169353 discloses an example of a secondary battery including the flat-shaped wound electrode body. In the secondary battery described in Japanese Patent Application Publication 2019-169353, a winding inner end (a positive electrode starting end portion) of a positive electrode and a winding inner end (a negative electrode starting end portion) of a negative electrode are disposed on an inner side of a flat portion of the wound electrode body. In addition, the winding inner end of the negative electrode has an extension portion extending toward the curved portion side from the winding inner end of the positive electrode, and the extension portion of the negative electrode is folded back within a range in which it does not overlap the positive electrode. According to the secondary battery described in Japanese Patent Application Publication 2019-169353, since a variation in thickness of the flat portion of the electrode body is inhibited, the electrode body can be easily housed in a battery case. Further, since a variation in distance between the positive electrode and the negative electrode (inter-electrode distance) can also be inhibited, it also has the effect of inhibiting precipitation of metallic lithium (metal Li) due to bias of a charge and discharge reaction.

SUMMARY

Incidentally, in recent years, there has been an increasing demand for improving durability and a life span of a secondary battery, and there is a demand for a technique capable of more appropriately inhibiting the precipitation of metallic lithium. The present disclosure has been made in view of such demands, and an object thereof is to provide a secondary battery capable of appropriately inhibiting precipitation of metallic lithium.

In order to achieve the object, the technique disclosed herein provides a secondary battery having the following configuration.

A secondary battery disclosed herein includes a flat wound electrode body in which a positive electrode plate and a negative electrode plate are wound with a separator interposed therebetween, and a battery case that houses the wound electrode body. The flat wound electrode body of the secondary battery has a pair of curved portions having curved outer surfaces and a flat portion having a flat outer surface connecting the pair of curved portions to each other. In addition, one end portion of the positive electrode plate in a longitudinal direction thereof is disposed inside the wound electrode body as a positive electrode starting end portion, and the other end portion is disposed outside the wound electrode body as a positive electrode terminating end portion. Further, one end portion of the negative electrode plate in a longitudinal direction thereof is disposed inside the wound electrode body as a negative electrode starting end portion, and the other end portion is disposed outside the wound electrode body as a negative electrode terminating end portion. The positive electrode starting end portion has a first region extending along the flat portion. The negative electrode starting end portion has a second region extending along the flat portion, a folded portion folded back from an end portion of the second region along a first curved portion, which is one of the pair of curved portions, and a third region extending from an end portion of the folded portion along the flat portion. In addition, an electrode starting end stacked portion in which the first region, the second region, and the third region overlap each other in a thickness direction thereof is formed in a part of the flat portion, and the positive electrode terminating end portion and the negative electrode terminating end portion are disposed in the first curved portion.

The secondary battery of this type is usually used in a state in which the flat portion of the wound electrode body is pressed from the outside of the battery case to reduce a distance between the positive electrode plate and the negative electrode plate (an inter-electrode distance) inside the electrode body. However, in a conventional wound electrode body, a thin region (a layer-deficient region) in which the number of layers of sheet-shaped members (a positive electrode plate, a negative electrode plate, and a separator) is smaller than in other regions may be generated in a flat portion near a curved portion. In this layer-deficient region, since a local pressing failure occurs, there is a possibility of precipitation of metal Li being accelerated due to an increase in the inter-electrode distance. On the other hand, in the secondary battery disclosed herein, a starting end portion of the negative electrode plate (negative electrode starting end portion) is folded back along the curved portion. In addition, the electrode starting end stacked portion in which the first region of the positive electrode plate, the second region of the negative electrode plate, and the third region of the negative electrode plate overlap each other is formed. Thus, since formation of the layer-deficient region in the flat portion near the curved portion can be prevented, the precipitation of metal Li due to the local pressing failure can be inhibited.

Further, in a general secondary battery, the wound electrode body generates heat due to chemical reactions during charging and discharging. In this case, when the number of layers of the electrode plates (the positive electrode plate and the negative electrode plate) differs between a first stacked portion and a second stacked portion, which face each other across a center line of the wound electrode body, a heat generation distribution in the wound electrode body becomes non-uniform. When charging and discharging are repeated in this state, deterioration of the electrode plates progresses in a specific region. As a result, a distribution of charging and discharging reactions in the wound electrode body becomes uneven. Such local deterioration of the electrode plates may also cause accelerated precipitation of metal Li. On the other hand, in the secondary battery disclosed herein, the terminating end portions of the positive electrode plate and the negative electrode plate are disposed in the curved portion in which the folded portion of the negative electrode starting end portion is disposed. Thus, in the flat portion except for the electrode starting end stacked portion, the number of stacked electrode plates can be the same in each of the first stacked portion and the second stacked portion of the wound electrode body facing each other across a winding axis thereof. As a result, since the heat generation distribution in the wound electrode body during charging and discharging can be made uniform, the precipitation of metal Li due to the local deterioration of the electrode plates can be inhibited.

As described above, according to the secondary battery disclosed herein, the precipitation of metallic lithium caused by the local pressing failure and the non-uniform heat generation distribution can be inhibited. This can contribute to improving durability and a life span of the secondary battery.

In one aspect of the secondary battery disclosed herein, a terminating end portion of the separator is disposed on an outermost side of any one of the pair of curved portions and is attached to the outermost side of the curved portion with a winding stop tape. Thus, the local pressing failure in the flat portion can be more appropriately prevented.

In one aspect of the secondary battery disclosed herein, only the separator is wound around an outermost circumference of the wound electrode body in one or more turns. Thus, an outer shape of the wound electrode body can be appropriately maintained.

In one aspect of the secondary battery disclosed herein, a ratio (w2/w1) of a length w2 in a width direction of the electrode starting end stacked portion to the total length w1 in a width direction of the flat portion is 0.5% or more and 20% or less. Thus, the local pressing failure in the flat portion can be appropriately prevented.

In one aspect of the secondary battery disclosed herein, the flat portion is divided into the first stacked portion and the second stacked portion, which sandwich the center line extending along the third region, and the total number of layers of the positive electrode plate and the negative electrode plate in each of the first stacked portion and the second stacked portion is 40 or more and 200 or less. The technique disclosed herein can be particularly appropriately applied to the wound electrode body in which the positive electrode plate and the negative electrode plate are stacked as described above.

In one aspect of the secondary battery disclosed herein, the wound electrode body is produced by winding a stacked body in which a first separator, the negative electrode plate, a second separator, and the positive electrode plate are stacked in order. Further, in such an aspect, it is preferable that a first extension portion extending from the negative electrode starting end portion be formed at one end portion of the first separator in the longitudinal direction, and a second extension portion extending from the negative electrode starting end portion be formed at one end portion of the second separator in the longitudinal direction. This makes a surface pressure distribution in the entire flat portion uniform and thus can further improve the Li precipitation resistance.

Also, in the aspect of forming the first extension portion and the second extension portion, each of the first extension portion and the second extension portion is preferably folded back along a second curved portion, which is the other of the pair of curved portions, to form a separator stacked portion in which only the first separator and the second separator are stacked. This makes the surface pressure distribution in the flat portion more uniform and thus can further improve the Li precipitation resistance.

In one aspect of the secondary battery disclosed herein, an adhesive layer is provided on a surface of at least one of the first separator and the second separator. Thus, because positional displacement of each of the positive electrode starting end portion, the negative electrode starting end portion, the positive electrode terminating end portion, and the negative electrode terminating end portion can be inhibited, the effect of inhibiting the precipitation of Li provided by the technique disclosed herein can be more appropriately exhibited.

DETAILED DESCRIPTION

Figure 1:
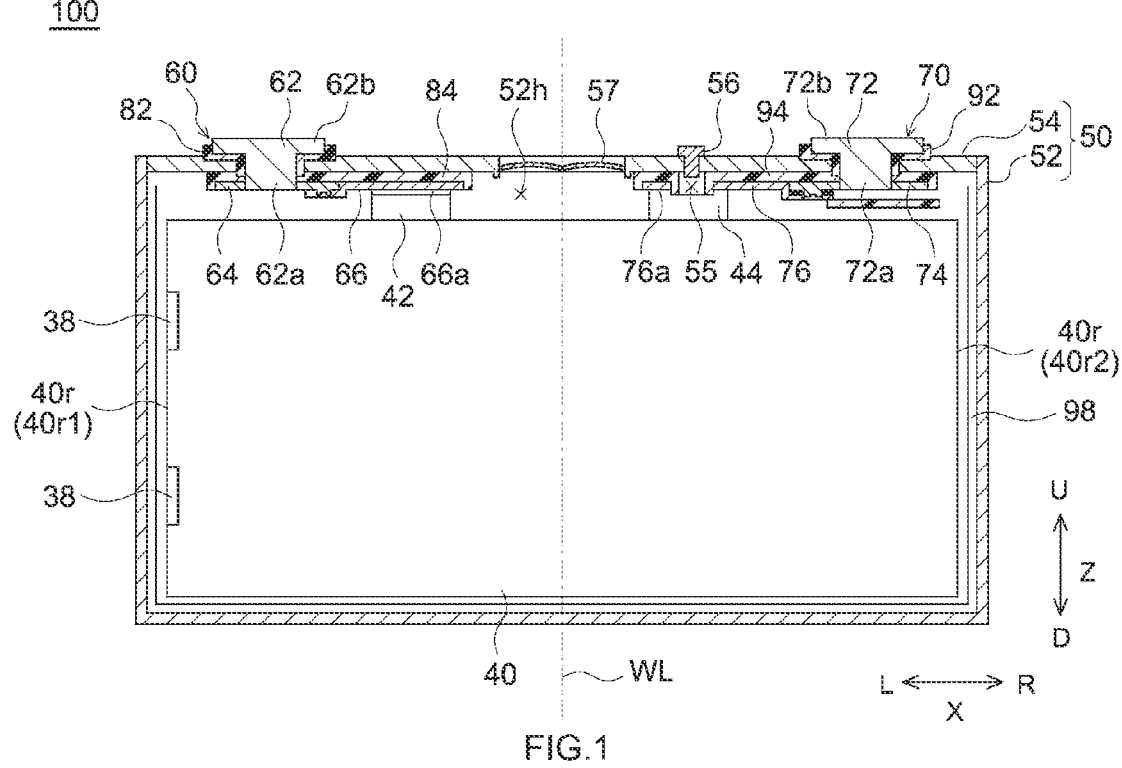
FIG. 1 is a cross-sectional view schematically showing a sealed battery according to one embodiment.

Embodiments of the technique disclosed herein will be described below with reference to the drawings. Further, matters other than those specifically mentioned in the present specification and necessary for implementing the technique disclosed herein (for example, materials of each member, manufacturing processes of a battery, and the like) may be understood by those skilled in the art as design matters based on conventional techniques in the art. The technique disclosed herein can be implemented on the basis of the content disclosed in the present specification and common technical knowledge in the art. Also, in the present specification, the notation "A to B" indicating a range includes meanings of "A or more and B or less" as well as "preferably larger than A" and "preferably smaller than B."

In addition, in the present specification, "secondary battery" indicates a power storage device in which charging and discharging reactions occur when charge carriers move between a pair of electrodes (a positive electrode and a negative electrode) via an electrolyte. The technique disclosed herein may be applied, for example, to secondary batteries (typically lithium ion secondary batteries) that use lithium ions ($Li^+$) as charge carriers. In the secondary batteries of this type, the charge carriers may be precipitated as metallic lithium (metal Li) in accordance with charging and discharging reactions.

Also, reference sign X in each figure referred to in the present specification indicates a "width direction." Reference sign Y indicates a "depth direction." Reference sign Z indicates a "height direction." Further, reference sign L in the width direction X indicates "left" and reference sign R indicates "right." Reference sign Fr in the depth direction Y indicates "forward" and reference sign Rr indicates "rearward." In addition, reference sign U in the height direction Z indicates "upward" and reference sign D indicates "downward." However, these directions are defined for convenience of explanation. The directions shown in the drawings are not intended to limit an installation form of the secondary battery disclosed herein when it is used.

Secondary Battery

Figure 2:
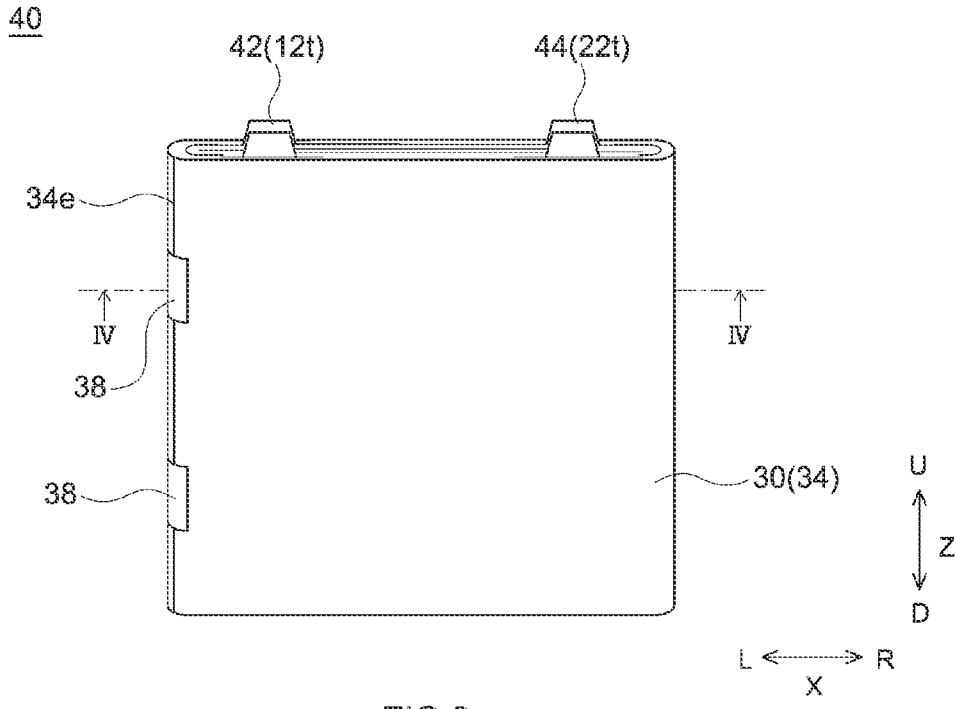
FIG. 2 is a perspective view of a wound electrode body of the secondary battery according to the one embodiment.
Figure 3:
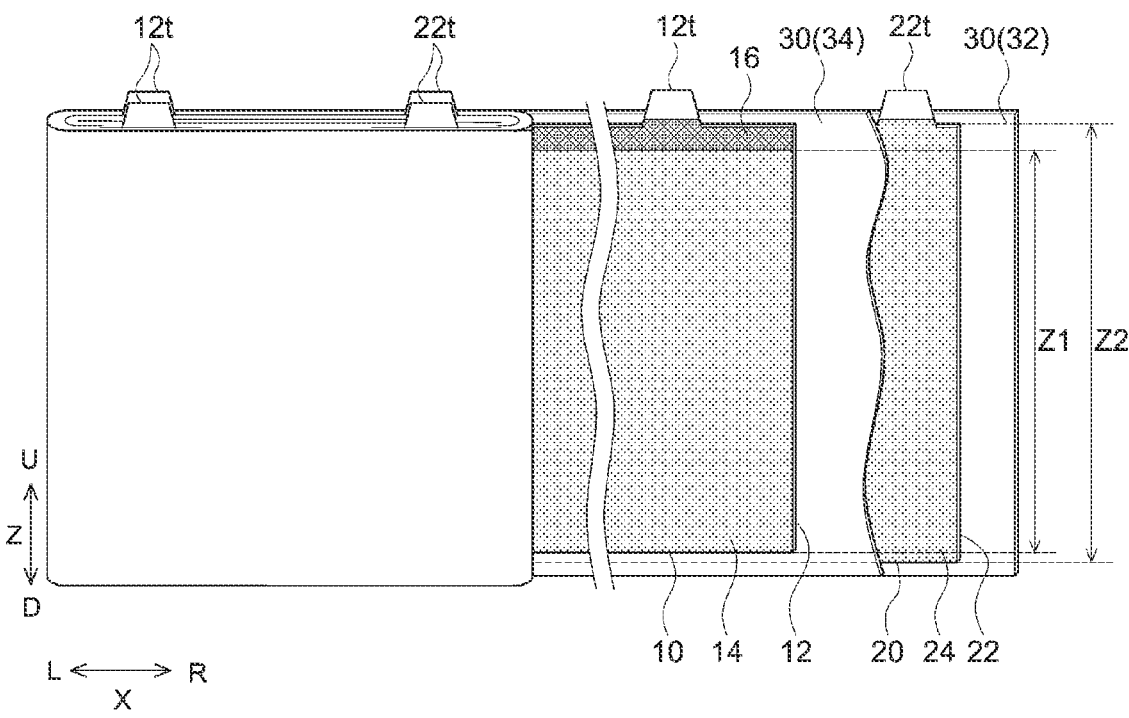
FIG. 3 is an exploded perspective view of the wound electrode body shown in FIG. 2.
Figure 4:
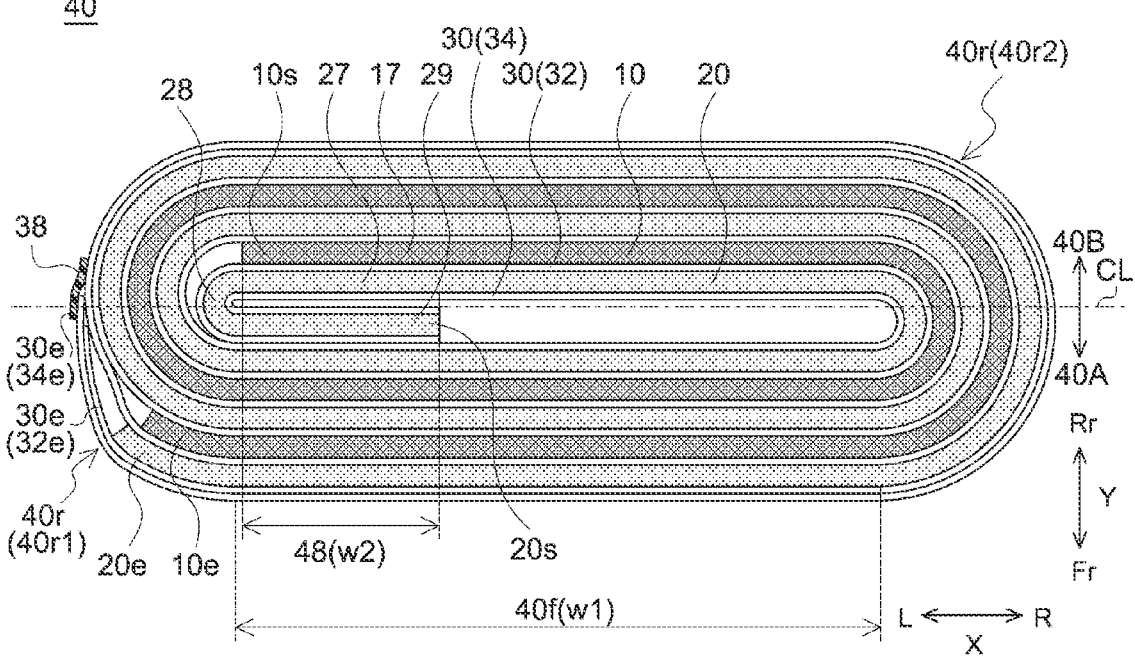
FIG. 4 is a cross-sectional view of the wound electrode body along line IV-IV in FIG. 2.

One embodiment of the secondary battery disclosed herein will be described below with reference to FIGS. 1 to 4. FIG. 1 is a cross-sectional view schematically showing a sealed battery according to the present embodiment. FIG. 2 is a perspective view of a wound electrode body of the secondary battery according to the present embodiment. FIG. 3 is an exploded perspective view of the wound electrode body shown in FIG. 2. FIG. 4 is a cross-sectional view of the wound electrode body along line IV-IV in FIG. 2.

As shown in FIG. 1, a secondary battery 100 according to the present embodiment includes a wound electrode body 40 and a battery case 50. In addition, the secondary battery 100 also includes a non-aqueous electrolyte solution (not shown), a positive electrode terminal 60 and a negative electrode terminal 70. These configurations will be described below.

(1) Battery Case

The battery case 50 is a container that houses the wound electrode body 40. The battery case 50 in the present embodiment has a flat bottomed rectangular parallelepiped (square) outer shape. Also, conventionally known materials can be used for the battery case 50 without particular limitations. For example, the battery case 50 may be made of a metal. As an example of a material of the battery case 50, aluminum, an aluminum alloy, iron, an iron alloy, or the like can be exemplified.

The battery case 50 includes an exterior body 52 and a sealing plate 54. The exterior body 52 is a flat bottomed rectangular container having an opening 52h on its upper surface. On the other hand, the sealing plate 54 is, in a plan view, a substantially rectangular plate-shaped member for closing the opening 52h of the exterior body 52. In addition, the sealing plate 54 is joined (for example, welded) to an upper end portion of the exterior body 52. Further, the sealing plate 54 is provided with a liquid injection hole 55 and a gas discharge valve 57. The liquid injection hole 55 is a through hole provided for injecting the non-aqueous electrolyte solution into the battery case 50 after the exterior body 52 and the sealing plate 54 are joined. Also, the liquid injection hole 55 is sealed with a sealing member 56 after the non-aqueous electrolyte solution has been injected. Further, the gas discharge valve 57 is a thinned portion designed to break (open) when a large amount of gas is generated in the battery case 50, thereby discharging the gas.

(2) Non-Aqueous Electrolyte Solution

Although not shown, in the secondary battery 100 according to the present embodiment, the non-aqueous electrolyte solution is housed inside the battery case 50. For the non-aqueous electrolytic solution, those used in conventionally known secondary batteries can be used without particular limitation. For example, the non-aqueous electrolyte solution is prepared by dissolving a supporting salt in a non-aqueous solvent. As an example of the non-aqueous solvent, carbonate solvents such as ethylene carbonate, dimethyl carbonate, and ethyl methyl carbonate can be exemplified. As an example of the supporting salt, a fluorine-containing lithium salt such as $LiPF_6$ can be exemplified.

(3) Electrode Terminal

Further, a positive electrode terminal 60 is attached to one end portion (on a left side L in FIG. 1) of the sealing plate 54 in the width direction X. The positive electrode terminal 60 includes a positive electrode external conductive material 62, a positive electrode internal conductive material 64, and a positive electrode current collector 66. The positive electrode external conductive material 62 has a shaft portion 62a penetrating the sealing plate 54 and a plate-shaped flange portion 62b disposed outside the battery case 50. Next, the positive electrode internal conductive material 64 is a plate-shaped conductive member disposed inside the battery case 50. The positive electrode internal conductive material 64 is disposed along an inner surface of the sealing plate 54. Also, one end portion (on the left L) of the positive electrode internal conductive material 64 in the width direction X is connected to the shaft portion 62a of the positive electrode external conductive material 62. Further, the positive electrode current collector 66 is also a plate-shaped conductive member disposed along the inner surface of the sealing plate 54. In addition, one end portion (on the left L) of the positive electrode current collector 66 in the width direction X is connected to the positive electrode internal conductive material 64. Also, a lower surface 66a of the positive electrode current collector 66 is connected to a positive electrode tab group 42 of the wound electrode body 40, which will be described later. In addition, in the present embodiment, various insulating members are attached between the positive electrode terminal 60 and the sealing plate 54. Specifically, a positive electrode gasket 82 is disposed between the positive electrode external conductive material 62 and the sealing plate 54. Further, a positive electrode internal insulating plate 84 is disposed between the positive electrode internal conductive material 64 (or the positive electrode current collector 66) and the sealing plate 54. These insulating members can prevent conduction between the positive electrode terminal 60 and the battery case 50.

On the other hand, the negative electrode terminal 70 is attached to the other end portion (on the right R in FIG. 1) of the sealing plate 54 in the width direction X. The negative electrode terminal 70 has substantially the same structure as the positive electrode terminal 60 described above. That is, the negative electrode terminal 70 includes a negative electrode external conductive material 72, a negative electrode internal conductive material 74, and a negative electrode current collector 76. In addition, the negative electrode external conductive material 72 has a shaft portion 72a penetrating the sealing plate 54 and a plate-shaped flange portion 72b disposed outside the battery case 50. Next, the negative electrode internal conductive material 74 is a plate-shaped conductive member disposed inside the battery case 50. The negative electrode internal conductive material 74 is disposed along the inner surface of the sealing plate 54. Also, the other end portion (on the right R) of the negative electrode internal conductive material 74 in the width direction X is connected to the shaft portion 72a of the negative electrode external conductive material 72. Further, the negative electrode current collector 76 is also a plate-shaped conductive member disposed along the inner surface of the sealing plate 54. In addition, the other end portion (on the right R) of the negative electrode current collector 76 in the width direction X is connected to the negative electrode internal conductive material 74. Also, a lower surface 76a of the negative electrode current collector 76 is connected to a negative electrode tab group 44 of the wound electrode body 40, which will be described later. Further, various insulating members are also attached between the negative electrode terminal 70 and the sealing plate 54. A negative electrode gasket 92 is disposed between the negative electrode external conductive material 72 and the sealing plate 54. In addition, a negative electrode internal insulating plate 94 is disposed between the negative electrode internal conductive material 74 (or the negative electrode current collector 76) and the sealing plate 54. These insulating members can prevent conduction between the negative electrode terminal 70 and the battery case 50. Also, in the present embodiment, through holes communicating with the liquid injection hole 55 are formed in the negative electrode current collector 76 and the negative electrode internal insulating plate 94. Thus, the non-aqueous electrolyte solution can be easily injected into the battery case 50 through the liquid injection hole 55.

Also, for the positive electrode terminal 60 and the negative electrode terminal 70, conductive materials used in conventionally known secondary batteries can be used without particular limitations. As examples of these conductive materials, aluminum, aluminum alloys, copper, copper alloys, and the like can be exemplified. Further, for the insulating members disposed between the positive electrode terminal 60 (or the negative electrode terminal 70) and the sealing plate 54, insulating materials used in conventionally known secondary batteries can be used without particular limitations. As examples of such insulating materials, polyolefin-based resins (for example, polypropylene (PP) and polyethylene (PE)), fluorine-based resins (for example, perfluoroalkoxy alkanes (PFAs) and polytetrafluoroethylene (PTFE)), and the like can be exemplified.

(4) Wound Electrode Body

As shown in FIG. 3, the electrode body in the present embodiment is a flat wound electrode body 40 in which the positive electrode plate 10 and the negative electrode plate 20 are wound via separators 30. As shown in FIG. 1, in the secondary battery 100 according to the present embodiment, the wound electrode body 40 is housed in the battery case 50 such that a winding axis WL of the wound electrode body 40 and the height direction Z substantially coincide with each other. That is, the "winding axis direction" in the following description is substantially the same direction as the height direction Z in the drawings. Also, the wound electrode body 40 is housed in the battery case 50 in a state in which it is covered with an insulating electrode body holder 98. This can prevent conduction between the wound electrode body 40 and the battery case 50. A configuration of the wound electrode body 40 according to the present embodiment will be described below.

(a) Positive Electrode Plate

As shown in FIG. 3, the positive electrode plate 10 is an elongated band-shaped member. The positive electrode plate 10 includes a positive electrode core body 12 which is a band-shaped metal foil and a positive electrode active material layer 14 applied to a surface of the positive electrode core body 12. Also, from the viewpoint of battery performance, the positive electrode active material layer 14 is preferably applied to both surfaces of the positive electrode core body 12. Further, positive electrode tabs 12t protruding outward (upward U) in the winding axis direction are formed on a side edge of the positive electrode plate 10 on one side in the winding axis direction (an upper side in the height direction Z). In the positive electrode tabs 12t, the positive electrode active material layer 14 is not provided on the surface of the positive electrode core body 12. In other words, the positive electrode tabs 12t are regions in which the positive electrode core body 12 is exposed. Also, a plurality of positive electrode tabs 12t in the positive electrode plate 10 before winding are formed at predetermined intervals in a longitudinal direction thereof (the width direction X in FIG. 3). In addition, in the wound electrode body 40 (see FIG. 2) after winding, the positive electrode tab group 42 in which the plurality of positive electrode tabs 12t are stacked is formed. Further, a protective layer 16 is formed on one side edge portion of the positive electrode plate 10 in the winding axis direction (upper side U in the height direction Z) to extend in the longitudinal direction (width direction X) of the positive electrode plate 10.

In addition, for each member constituting the positive electrode plate 10, a conventionally known material that can be used in general secondary batteries (for example, lithium ion secondary batteries) can be used without particular limitation. For example, a metal material having a predetermined conductivity can be preferably used for the positive electrode core body 12. The positive electrode core body 12 is preferably made of, for example, aluminum, an aluminum alloy, or the like. Further, a thickness of the positive electrode core body 12 is preferably 8 μm to 20 μm, more preferably 10 μm to 18 μm, and further preferably 12 μm to 15 μm.

Also, the positive electrode active material layer 14 is a layer containing a positive electrode active material. The positive electrode active material is a material capable of reversibly storing and releasing a charge carrier. From the viewpoint of stably producing a high-performance positive electrode plate 10, the positive electrode active material is preferably lithium transition metal composite oxides. The lithium-transition metal composite oxide preferably contains at least one of the group consisting of nickel (Ni), cobalt (Co), and manganese (Mn) as a transition metal. As a specific example, a lithium nickel cobalt manganese composite oxide (NCM), a lithium nickel composite oxide, a lithium cobalt composite oxide, a lithium manganese composite oxide, a lithium nickel manganese composite oxide, a lithium nickel cobalt aluminum composite oxide (NCA), a lithium iron nickel manganese composite oxide, or the like can be exemplified. Further, as a preferable example of the lithium transition metal composite oxide containing no Ni, Co, and Mn, a lithium iron phosphate-based composite oxide (LFP) and the like can be exemplified. In addition, the term "lithium nickel cobalt manganese composite oxide" as used herein is a term that includes oxides containing an additive element in addition to the main constituent elements (Li, Ni, Co, Mn, and O). As an example of such an additive element, a transition metal element or a typical metal element such as Mg, Ca, Al, Ti, V, Cr, Si, Y, Zr, Nb, Mo, Hf, Ta, W, Na, Fe, Zn, and Sn can be exemplified. Further, the additive element may be a metalloid element such as B, C, Si, or P or a non-metal element such as S, F, Cl, Br, or I. Although the detailed description will be omitted, this also applies to other lithium transition metal composite oxides described as "-based composite oxides". Also, the positive electrode active material layer 14 may contain additives other than the positive electrode active material. As an example of such additives, a conductive material, a binder, and the like can be exemplified. As a specific example of the conductive material, a carbon material such as acetylene black (AB) can be exemplified. As a specific example of the binder, a resin binder such as polyvinylidene fluoride (PVdF) can be exemplified. In addition, when the total solid content of the positive electrode active material layer 14 is set to 100% by mass, the content of the positive electrode active material is approximately 80% by mass or more, and typically 90% by mass or more.

Further, a dimension Z1 of the positive electrode active material layer 14 in the height direction Z is preferably 45 mm to 105 mm, more preferably 70 mm to 93 mm, and further preferably 73 mm to 78 mm. The dimension Z1 of the positive electrode active material layer 14 is, for example, about 75 mm. In the wound electrode body 40 in which the dimension Z1 of the positive electrode active material layer 14 is 45 mm or more, a local pressing failure and non-uniform heat generation distribution are likely to occur, and thus Li precipitation resistance tends to be lowered. However, according to the technique disclosed herein, even in the large-sized wound electrode body 40 of this type, it is possible to appropriately prevent the local pressing failure and the non-uniform heat generation distribution. That is, the technique disclosed herein can be applied particularly appropriately to the secondary battery 100 having the large-sized wound electrode body 40 of this type. Also, a thickness of the positive electrode active material layer 14 on one surface of the positive electrode core body 12 is preferably 10 μm to 100 μm, more preferably 20 μm to 80 μm, and further preferably 50 μm to 75 μm. In addition, in the present specification, the "thickness" of the wound electrode body or each constituent member of the wound electrode body indicates a dimension in a direction perpendicular to a flat portion 40f of the wound electrode body 40 (that is, the depth direction Y).

On the other hand, the protective layer 16 is a layer configured to have lower electrical conductivity than the positive electrode active material layer 14. By providing the protective layer 16 in the region adjacent to an end side of the positive electrode plate 10, it is possible to prevent direct contact between the positive electrode core body 12 and a negative electrode active material layer 24 and inhibit occurrence of an internal short circuit therebetween when the separators 30 are damaged. For example, a layer containing insulating ceramic particles as the protective layer 16 is preferably formed. As an example of such ceramic particles, inorganic oxides such as alumina ($Al_2O_3$), magnesia (MgO), silica ($SiO_2$), and titania ($TiO_2$), nitrides such as aluminum nitride and silicon nitride, metal hydroxides such as calcium hydroxide, magnesium hydroxide, and aluminum hydroxide, clay minerals such as mica, talc, boehmite, zeolite, apatite, and kaolin, or glass fibers can be exemplified. Among the above, alumina, boehmite, aluminum hydroxide, silica, and titania are preferable in consideration of insulation and heat resistance. Further, the protective layer 16 may contain a binder for fixing the ceramic particles on the surface of the positive electrode core body 12. As an example of such a binder, a resin binder such as polyvinylidene fluoride (PVdF) can be exemplified. Also, the protective layer 16 is not an essential component of the positive electrode plate. That is, in the secondary battery disclosed herein, a positive electrode plate on which a protective layer is not formed can also be used.

(b) Negative Electrode Plate

As shown in FIG. 3, the negative electrode plate 20 is an elongated band-shaped member. The negative electrode plate 20 includes a negative electrode core body 22 that is a band-shaped metal foil, and a negative electrode active material layer 24 provided on a surface of the negative electrode core body 22. Also, from the viewpoint of battery performance, the negative electrode active material layer 24 is preferably applied to both surfaces of the negative electrode core body 22. Further, negative electrode tabs 22t protruding outward (upward U) in the winding axis direction are formed on a side edge of the negative electrode plate 20 on one side in the winding axis direction (upper side in the height direction Z). In the negative electrode tabs 22t, the negative electrode active material layer 24 is not applied to the surface of the negative electrode core body 22. In other words, the negative electrode tabs 22t are regions in which the negative electrode core body 22 is exposed. Also, in the secondary battery 100 according to the present embodiment, the positive electrode tabs 12t of the positive electrode plate 10 and the negative electrode tabs 22t of the negative electrode plate 20 protrude in the same direction (upward U in the height direction Z). Further, the negative electrode tabs 22t of the negative electrode plate 20 before winding are formed at predetermined intervals in a longitudinal direction thereof (the width direction X in FIG. 3). In addition, in the wound electrode body 40 (see FIG. 2) after winding, the negative electrode tab group 44 in which a plurality of negative electrode tabs 22t are stacked is formed.

In addition, for each member constituting the negative electrode plate 20, a conventionally known material that can be used in general secondary batteries (for example, lithium ion secondary batteries) can be used without particular limitation. For example, a metal material having a predetermined conductivity can be preferably used for the negative electrode core body 22. The negative electrode core body 22 is preferably made of, for example, copper or a copper alloy. Also, a thickness of the negative electrode core body 22 is preferably 4 μm to 20 μm, more preferably 6 μm to 15 μm, and further preferably 8 μm to 10 μm.

Further, the negative electrode active material layer 24 is a layer containing a negative electrode active material. The negative electrode active material is not particularly limited as long as a charge carrier can be reversibly stored and released in relation to the positive electrode active material described above, and a material that can be used in conventional general secondary batteries can be used without particular limitation. As an example of such a negative electrode active material, a carbon material, a silicon-based material, or the like can be exemplified. As the carbon material, for example, graphite, hard carbon, soft carbon, amorphous carbon, or the like may be used. Also, amorphous carbon-coated graphite in which a surface of graphite is coated with amorphous carbon can also be used. On the other hand, as an example of the silicon-based material, silicon, silicon oxide (silica), or the like can be exemplified. Also, the silicon-based material may contain other metal elements (for example, alkaline earth metals) and oxides thereof. Also, the negative electrode active material layer 24 may contain additives other than the negative electrode active material. As an example of such additives, a binder, a thickener, and the like can be exemplified. As specific examples of the binder, a rubber-based binder such as styrene-butadiene rubber (SBR), an acrylic-based binder such as polyacrylic acid (PAA), and the like can be exemplified. Also, as a specific example of the thickener, carboxymethyl cellulose (CMC) or the like can be exemplified. Further, when the total solid content of the negative electrode active material layer 24 is set to 100% by mass, the content of the negative electrode active material is approximately 30% by mass or more, and typically 50% by mass or more. Also, the negative electrode active material may occupy 80% by mass or more of the negative electrode active material layer 24, or may occupy 90% by mass or more.

Further, a dimension Z2 of the negative electrode active material layer 24 in the height direction Z is preferably 49 mm to 108 mm, more preferably 74 mm to 97 mm, further preferably 77 mm to 82 mm. The dimension Z2 of the negative electrode active material layer 24 is, for example, about 79 mm. In addition, the dimension Z2 of the negative electrode active material layer 24 is preferably longer than the dimension Z1 of the positive electrode active material layer 14 described above. Thus, since Li$^+$ storage capacity of the negative electrode active material layer 24 becomes relatively larger, precipitation of metal Li on the negative electrode plate 20 side can be inhibited. Also, a thickness of the negative electrode active material layer 24 on one side of the negative electrode core body 22 is preferably 10 µm to 200 µm, more preferably 50 µm to 100 µm, and further preferably 75 µm to 85 µm. Moreover, the thickness (an applied amount) of the negative electrode active material layer 24 is preferably larger than the thickness of the positive electrode active material layer 14. This increases an opposite capacity ratio, which is a capacity ratio of the negative electrode active material layer 24 to the positive electrode active material layer 14. As a result, the Li$^+$ storage capacity of the negative electrode active material layer 24 can be relatively increased, and the precipitation of metal Li on the negative electrode plate 20 side can be inhibited.

(c) Separators

The wound electrode body 40 in the present embodiment includes two separators 30.

These separators 30 are sheet-shaped members having a function of preventing contact between the positive electrode plate 10 and the negative electrode plate 20 and allowing charge carriers (for example, lithium ions) to pass therethrough. As an example of such a separator 30, an insulating sheet in which a plurality of fine pores through which charge carriers can pass are formed can be exemplified. Also, in the following, for convenience of explanation, the separator 30 disposed between the negative electrode plate 20 and the positive electrode plate 10 at the start of winding may be referred to as a "first separator 32," and the separator 30 disposed outside the negative electrode plate 20 may be referred to as a "second separator 34" (see FIG. 4).

For the separators 30, those used in conventionally known secondary batteries can be used without particular limitations. As a preferable example of the separators 30, a separator including a resin base material layer made of a polyolefin resin (for example, polyethylene (PE), or polypropylene (PP)) or the like can be exemplified. Also, a heat-resistant layer containing an insulating inorganic material is preferably formed on a surface of the resin base material layer. Thus, shrinkage and breakage of the separators 30 due to temperature rise can be inhibited. As the inorganic material, which is a main component of the heat-resistant layer, ceramic particles such as alumina, boehmite, aluminum hydroxide, and titania can be exemplified. In addition, the heat-resistant layer contains a binder for binding ceramic particles. As the binder, a resin binder such as polyvinylidene fluoride (PVdF) or an acrylic resin can be used. Also, the two separators 30 (the first separator 32 and the second separator 34) used in the present embodiment may be made of the same material or may be made of different materials. Also, a thickness of each separator 30 is preferably 4 µm to 30 µm, more preferably 6 µm to 20 µm, and further preferably 8 µm to 16 µm.

Further, it is particularly preferable that the heat-resistant layer of the separator 30 have a porosity in the range of 30% to 60%. The separator 30 having the heat-resistant layer having such a porosity is deformed to be crushed during press-molding of the wound electrode body 40, so that it can function as a cushioning material that absorbs a variation in the thickness of the wound electrode body 40. That is, by using the separators 30 having the heat-resistant layer with the above porosity, a surface pressure distribution of the flat portion 40f can be made uniform, which can contribute to improvement of the Li precipitation resistance. Also, the porosity of the heat-resistant layer described above indicates a porosity before the wound electrode body 40 is manufactured (before press-molding). In the wound electrode body 40 after press-molding, by measuring the porosity of the heat-resistant layer of the separators 30 disposed in a region in which a press-molding pressure is not directly applied, the porosity of the heat-resistant layer before press-molding can be examined. In addition, as the "region in which a press-molding pressure is not directly applied" here, end portions 30e (see FIG. 4) of the separators 30 disposed in a curved portion 40r of the wound electrode body 40, or the like can be exemplified.

Also, in a case in which the separators 30 having the heat-resistant layer are caused to function as cushioning materials, press-molding is preferably performed such that a thickness of the resin base material layer after pressing is reduced to be equal to or less than 70% (more preferably 60%, and further preferably 50%) of a thickness thereof before pressing. By sufficiently deforming the heat-resistant layer in this way, a variation in the thickness of the wound electrode body 40 can be sufficiently absorbed. Further, in order to examine a reduction rate of the thickness of the resin base material layer due to the press-molding in the wound electrode body 40 after production, it is preferable to calculate a ratio between a thickness of the heat-resistant layer of the separator 30 interposed between the positive electrode plate 10 and the negative electrode plate 20 inside the flat portion 40f and a thickness of the heat-resistant layer at the terminating end portion 30e disposed in the curved portion 40r.

Also, an adhesive layer is preferably provided on at least one surface of each separator 30. Such an adhesive layer is a layer containing a resin binder such as polyvinylidene fluoride (PVdF) or an acrylic resin and adheres to the positive electrode plate 10 and the negative electrode plate 20 using pressure, heat, or the like. Thus, positional displacement of sheet members (the positive electrode plate 10, the negative electrode plate 20, and the separators 30) inside the wound electrode body 40 can be prevented. As will be described in detail later, in the secondary battery 100 according to the present embodiment, the precipitation of metal Li is inhibited by arranging respective end portions of the positive electrode plate 10 and the negative electrode plate 20 (a positive electrode starting end portion 10s, a negative electrode starting end portion 20s, a positive electrode terminating end portion 10e, and a negative electrode terminating end portion 20e) at predetermined positions. For this reason, by using the separators 30 having the adhesive layer to prevent the positional displacement of each of end portions of the positive electrode plate 10 and the negative electrode plate 20, the Li precipitation inhibition effect provided by the technique disclosed here can be more stably exhibited. Also, from the viewpoint of more appropriately preventing the positional displacement of the sheet members, the adhesive layer is preferably formed on both surfaces of the separators 30. Further, in a case in which the adhesive layer is formed on only one surface of the separators 30, the adhesive layer is preferably formed on a surface in contact with the positive electrode plate 10. This is because an arrangement position of the positive electrode plate 10 tends to be more easily displaced than that of the negative electrode plate 20. Also, in the case of the separators 30 having the heat-resistant layer, the adhesive layer may be separately formed on a surface of the heat-resistant layer, or a heat-resistant layer that also functions as an adhesive layer may be formed. The heat-resistant layer that also serves as the adhesive layer can be formed by increasing a content ratio of a binder. For example, when the total weight of the heat-resistant layer is set to 100% by mass, the content ratio of the binder may be 5% by mass or more (preferably 10% by mass or more). Thus, the heat-resistant layer that exhibits a certain level of adhesiveness and functions as the adhesive layer can be formed. However, the secondary battery disclosed herein is not limited to the form in which a separator having an adhesive layer on its surface is used. In the case of using a separator having no adhesive layer, the effects of improving ion permeability of the separator and improving battery performance can be obtained.

Further, a mesh-shaped protruding portion is preferably formed on a surface of the adhesive layer in a plan view. Since the mesh-shaped protruding portion is easily pressed and deformed during press-molding of the wound electrode body 40, it can function as a cushioning material between the sheet-shaped members. As a result, it is possible to inhibit a variation in confining pressure in a surface of the flat portion 40f after press-molding, and more preferably inhibit the precipitation of metal Li. Also, the adhesive layer is not limited to the above form. For example, the adhesive layer itself may be formed in a mesh shape. In other words, a mesh-shaped adhesive layer may be formed on the surface of the resin base material layer or the heat-resistant layer in a plan view. Such a mesh-shaped adhesive layer can also function as a cushioning material.

(d) Arrangement Positions of Sheet Members

Next, specific arrangement positions of the sheet members (the positive electrode plate 10, the negative electrode plate 20, and the separators 30) in the wound electrode body 40 will be described. As shown in FIG. 3, the wound electrode body 40 in the present embodiment is produced by winding the positive electrode plate 10 and the negative electrode plate 20 via two separators 30. Specifically, first, a stacked body is produced by stacking the first separator 32, the negative electrode plate 20, the second separator 34, and the positive electrode plate 10 in order. In this case, stacked positions of each sheet member are adjusted such that the positive electrode tabs 12t and the negative electrode tabs 22t protrude from a side edge portion of the stacked body on one side in the winding axis direction (upper side U in the height direction Z). Then, the produced stacked body is wound to produce a cylindrical body. Then, by pressing this cylindrical body, the flat-shaped wound electrode body 40 is produced.

Also, as shown in FIG. 4, in the present embodiment, a length of the second separator 34 is longer than lengths of other sheet members. The second separator 34 is wound more than other sheet members to cover terminating end portions of other sheet members (the first separator 32, the negative electrode plate 20, the positive electrode plate 10). As a result, the wound electrode body 40 in which only the separator 30 is wound around the outermost circumference in one or more turns is produced. Thus, it is possible to prevent other sheet members after winding from unraveling, so that an outer shape of the wound electrode body can be appropriately maintained. Further, as shown in FIGS. 2 and 4, a terminating end portion (a second terminating end portion 34e) of the second separator 34 is disposed on the outermost side of a first curved portion 40r1. In addition, the second terminating end portion 34e is attached to the outermost side of the first curved portion 40r1 with a winding stop tape 38. Although the details will be described later, when a local pressing failure occurs in the flat portion 40f of the wound electrode body 40, precipitation of metallic lithium may be accelerated. On the other hand, when the terminating end portions 30e of the separators 30 and the winding stop tape 38 are disposed in the curved portion 40r, the local pressing failure in the flat portion 40f can be appropriately inhibited.

In the wound electrode body 40 after production, one end portion of the positive electrode plate 10 in the longitudinal direction is disposed inside the wound electrode body 40 as the positive electrode starting end portion 10s. On the other hand, the other end portion of the positive electrode plate 10 is disposed outside the wound electrode body 40 as the positive electrode terminating end portion 10e. Similarly, one end portion of the negative electrode plate 20 is disposed inside the wound electrode body 40 as the negative electrode starting end portion 20s. On the other hand, the other end portion of the negative electrode plate 20 is disposed outside the wound electrode body 40 as the negative electrode terminating end portion 20e. Also, although the description is omitted in FIG. 4, the positive electrode active material layer 14 (see FIG. 3) is applied to the positive electrode plate 10 in FIG. 4 from the positive electrode starting end portion 10s to the positive electrode terminating end portion 10e in the longitudinal direction. Similarly, the negative electrode active material layer 24 (see FIG. 3) is applied to the negative electrode plate 20 from the negative electrode starting end portion 20s to the negative electrode terminating end portion 20e in the longitudinal direction.

Further, as described above, the wound electrode body 40 in the present embodiment is press-molded into a flat shape. As shown in FIGS. 2 and 4, the flat wound electrode body 40 has a pair of curved portions 40r each having curved outer surfaces, and a flat portion 40f having a flat outer surface connecting the pair of curved portions 40r to each other. Also, in the following description, the curved portion 40r closer to the positive electrode starting end portion 10s and the negative electrode starting end portion 20s will be referred to as a "first curved portion 40r1," and the curved portion 40r on a side opposite thereto will be referred to as a "second curved portion 40r2." In addition, in the secondary battery 100, the flat portion 40f of the wound electrode body 40 is pressed from the outside of the battery case 50. Thus, the flat portion 40f can be used in a state in which an inter-electrode distance between the positive electrode plate 10 and the negative electrode plate 20 is reduced. That is, in the wound electrode body 40 of the present embodiment, the region in which the positive electrode plate 10 and the negative electrode plate 20 face each other in the flat portion 40f serves as a main charging and discharging reaction place.

Here, the secondary battery 100 according to the present embodiment is characterized in that the end portions of each electrode plate (the positive electrode starting end portion 10s, the negative electrode starting end portion 20s, the positive electrode terminating end portion 10e, and the negative electrode terminating end portion 20e) are disposed at predetermined positions. Thus, the local pressing failure and the non-uniform heat generation distribution can be appropriately prevented, and the precipitation of metal Li can be inhibited. The arrangement positions of the end portions of the electrode plates in the present embodiment will be described below.

(d-1) Arrangement Positions of Starting End Portions

Figure 6:
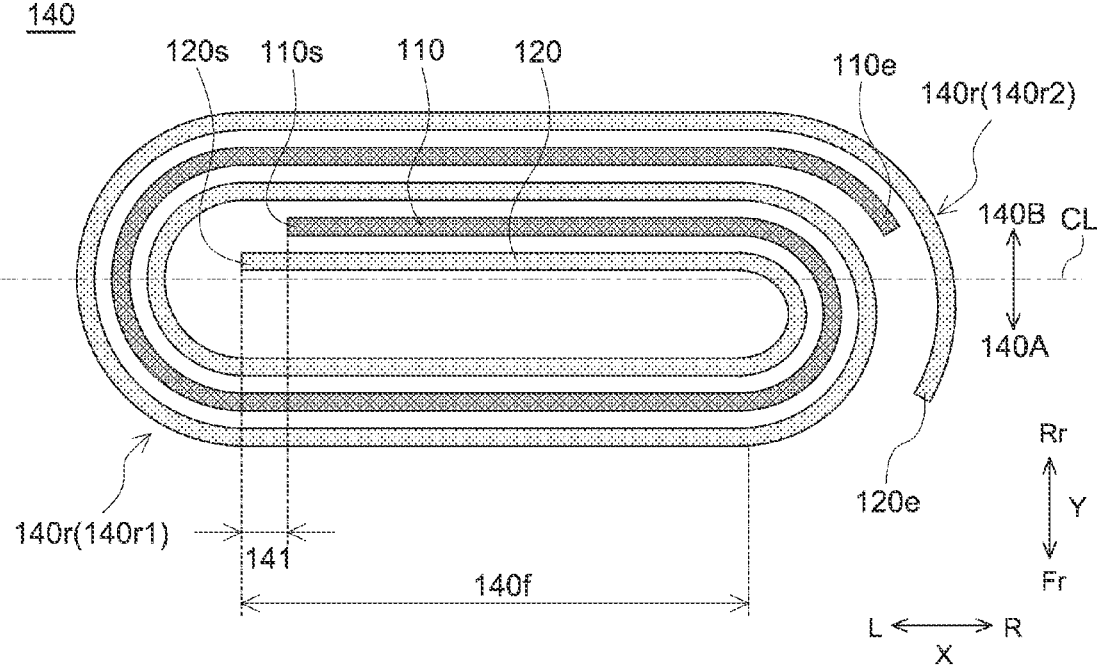
FIG. 6 is a diagram schematically showing a cross-sectional structure of a conventional wound electrode body.

First, in the secondary battery 100 according to the present embodiment, the positive electrode starting end portion 10s and the negative electrode starting end portion 20s are disposed at predetermined positions to prevent occurrence of the local pressing failure. Such a feature will be described in comparison with a conventional secondary battery. FIG. 6 is a diagram schematically showing a cross-sectional structure of a wound electrode body of a conventional secondary battery. Also, the description of the separators is omitted in FIG. 6 for convenience of explanation.

First, in a conventional wound electrode body 140 shown in FIG. 6, a layer-deficient region 141 in which the number of layers of sheet members is deficient is formed in a flat portion 140*f* near a curved portion 140*r*. Thus, a thickness of the wound electrode body 140 may be partially insufficient. Specifically, in producing the wound electrode body 140 (such as winding, press-molding, and the like of the sheet members), a large tension is applied to each of a positive electrode plate 110 and a negative electrode plate 120. Thus, both of a positive electrode starting end portion 110*s* and a negative electrode starting end portion 120*s* (in particular, the positive electrode starting end portion 110*s*) are pulled toward the flat portion 140*f*. In this case, if positions of the positive electrode starting end portion 110*s* and the negative electrode starting end portion 120*s* are displaced, the layer-deficient region 141 is formed in the flat portion 140*f* near the curved portion 140*r*. When the wound electrode body 140 having the layer-deficient region 141 is used while being pressed, a local pressing failure occurs in the layer-deficient region 141, which results in an increase in electrical resistance. In this case, current concentration may occur around the layer-deficient region 141 and the metal Li may precipitate.

In contrast, in the present embodiment, in order to prevent occurrence of the local pressing failure in the flat portion 40*f* of the wound electrode body 40, the arrangement positions of the positive electrode starting end portion 10*s* and the negative electrode starting end portion 20*s* are determined. Specifically, as shown in FIG. 4, the positive electrode starting end portion 10*s* in the present embodiment has a first region 17 extending along the flat portion 40*f* of the wound electrode body 40. On the other hand, the negative electrode starting end portion 20*s* has a second region 27 extending along the flat portion 40*f*, a folded portion 28 folded back from an end portion of the second region 27 along the first curved portion 40*r*1, and a third region 29 extending from an end portion of the folded portion 28 along the flat portion 40*f*. In addition, in the wound electrode body 40 according to the present embodiment, an electrode starting end stacked portion 48 in which the first region 17, the second region 27, and the third region 29 overlap each other in a thickness direction thereof (depth direction Y) is formed in a part of the flat portion 40*f*. This electrode starting end stacked portion 48 has a larger number of layers of sheet members than other regions of the flat portion 40*f*. For this reason, according to the present embodiment, it is possible to prevent formation of a layer-deficient region (reference numeral 141 in FIG. 6) in the flat portion 40*f* near the first curved portion 40*r*1. Thus, it is possible to inhibit occurrence of the local pressing failure in the flat portion 40*f* near the first curved portion 40*r*1. Also, in the flat portion 40*f* excluding the electrode starting end stacked portion 48, the number of layers of sheet members is smaller than that of the electrode starting end stacked portion 48. However, since the flat portion 40*f* has a sufficient width, a pressure from the outside of the battery case is appropriately distributed, and thus local pressing failure does not occur. The present inventors have confirmed this fact through experiments. For this reason, according to the present embodiment, it is possible to appropriately inhibit the precipitation of metal Li due to the local pressing failure.

Also, in the present specification, each of the first region 17, the second region 27 and the third region 29 is described as "extending along the flat portion 40*f*." However, such description does not mean that each of the first region 17, the second region 27 and the third region 29 is parallel to the outer surface of the flat portion 40*f*. That is, each of the first region 17, the second region 27 and the third region 29 may be slightly inclined with respect to the outer surface of the flat portion 40*f*. Further, each of the first region 17, the second region 27, and the third region 29 may not be strictly linear, and may be curved or meander. Similarly, the folded portion 28 does not have to be parallel to the outer surface of the first curved portion 40*r*1. In addition, this folded portion 28 may meander or the like.

(d-2) Arrangement Positions of Terminating End portions

Next, in the secondary battery 100 according to the present embodiment, the non-uniform heat generation distribution is inhibited by disposing the positive electrode terminating end portion 10*e* and the negative electrode terminating end portion 20*e* at predetermined positions. Such a feature will be described below in comparison with a conventional secondary battery.

For example, in the conventional wound electrode body 140 shown in FIG. 6, a positive electrode terminating end portion 110*e* and a negative electrode terminating end portion 120*e* are located, not in the curved portion (first curved portion 140*r*1) adjacent to the positive electrode starting end portion 110*s* and the negative electrode starting end portion 120*s*, but in the curved portion (second curved portion 140*r*2) separated from the starting end portions of each electrode. Specifically, when the positive electrode terminating end portion 110*e* and the negative electrode terminating end portion 120*e* are disposed on the flat portion 140*f* near the first curved portion 140*r*1 due to manufacturing variations, the positive electrode starting end portion 110*s*, the negative electrode starting end portion 120*s*, and the positive electrode terminating end portion 110*e*, and the negative electrode terminating end portion 120*e* are adjacent to each other. In this case, there is a high possibility that the local pressing failure will occur in the flat portion 140*f* near the first curved portion 140*r*1. In the conventional wound electrode body 140, in order to prevent such a local pressing failure, the positive electrode terminating end portion 110*e* and the negative electrode terminating end portion 120*e* are disposed on the second curved portion 140*r*2 separated from the positive electrode starting end portion 110*s* and the negative electrode starting end portion 120*s*. However, as shown in FIG. 6, when the positive electrode terminating end portion 110*e* and the negative electrode terminating end portion 120*e* are disposed on the second curved portion 140*r*2, the precipitation of metal Li due to the non-uniform heat generation distribution may be accelerated. Specifically, in a case in which a line along the negative electrode starting end portion 120*s* is set to a center line CL of the wound electrode body 140, the number of layers of the positive electrode plate 110 and the negative electrode plate 120 is different between a first stacked portion 140A and a second stacked portion 140B that sandwich the center line CL. For example, in the wound electrode body 140 shown in FIG. 6, the total number of layers of the positive electrode plate 110 and the negative electrode plate 120 in the first stacked portion 140A is three. On the other hand, in most of the second stacked portion 140B, the total number of layers of the positive electrode plate 110 and the negative electrode plate 120 is five. When the secondary battery including the wound electrode body 140 having such a configuration is charged and discharged, the second stacked portion 140B having a larger number of layers of electrode plates generates a relatively large amount of heat. In addition, when charging and discharging are repeated in this state, a temperature of the second stacked portion 140B rises and deterioration of the electrode plates progresses. As a result, the precipitation of metal Li may be accelerated.

On the other hand, in the present embodiment, the arrangement positions of the positive electrode terminating end portion 10e and the negative electrode terminating end portion 20e are determined from the viewpoint of making the total number of layers of the positive electrode plate 10 and the negative electrode plate 20 the same between the first stacked portion 40A and the second stacked portion 40B. Specifically, as shown in FIG. 4, in the present embodiment, the positive electrode terminating end portion 10e and the negative electrode terminating end portion 20e are disposed in the curved portion (first curved portion 40r1) in which the folded portion 28 of the negative electrode starting end portion 20s is disposed. In this way, by aligning the arrangement positions of the starting end portions and the terminating end portions in the circumferential direction during winding, the number of layers of electrode plates in each of the first stacked portion 40A and the second stacked portion 40B can be the same. That is, in the present embodiment, the total number of layers of the positive electrode plate 10 and the negative electrode plate 20 is the same between the first stacked portion 40A and the second stacked portion 40B that sandwich the center line CL of the wound electrode body 40. For example, in the wound electrode body 40 shown in FIG. 4, the total number of layers of the positive electrode plate 10 and the negative electrode plate 20 is five in each of the first stacked portion 40A and the second stacked portion 40B. Thus, an amount of heat generated in each of the first stacked portion 40A and the second stacked portion 40B during charging and discharging becomes substantially uniform, so that precipitation of metal Li due to local deterioration of the electrode plates can be inhibited. Also, in the present specification, the "center line CL of the wound electrode body 40" refers to a line along the negative electrode starting end portion 20s (specifically, the third region 29). More specifically, the center line CL is a line passing between the second region 27 and the third region 29 of the negative electrode starting end portion 20s and extending along the flat portion 40f.

Further, as described above, in the wound electrode body 40 of the present embodiment, the electrode starting end stacked portion 48 in which the first region 17, the second region 27, and the third region 29 overlap each other is formed. As shown in FIG. 4, in the electrode starting end stacked portion 48, the number of layers of the negative electrode plate 20 is one more than in other regions of the flat portion 40f. That is, it can be said that the total number of layers of electrode plates in the first stacked portion 40A and the second stacked portion 40B differ in the electrode starting end stacked portion 48. However, since the third region 29 of the negative electrode plate 20 disposed in the electrode starting end stacked portion 48 does not face the positive electrode plate 10, no charging and discharging reaction occurs. That is, the difference in the total number of layers in the electrode starting end stacked portion 48 does not affect the amount of heat generated in each of the first stacked portion 40A and the second stacked portion 40B.

In addition, in the first curved portion 40r1 in the present embodiment, the negative electrode terminating end portion 20e extends from the positive electrode terminating end portion 10e. By making the negative electrode plate 20 longer than the positive electrode plate 10 in this manner, the entire area of the positive electrode plate 10 in a length direction thereof can be caused to face the negative electrode plate 20. Thus, the battery capacity can be appropriately improved. Moreover, the positive electrode terminating end portion 10e and the negative electrode terminating end portion 20e are preferably disposed in a region of the first curved portion 40r1 on the first stacked portion 40A side (a front side Fr in the depth direction Y). By winding the positive electrode plate 10 and the negative electrode plate 20 such that the positive electrode terminating end portion 10e and the negative electrode terminating end portion 20e do not exceed the center line CL of the wound electrode body 40, a width dimension of the wound electrode body 40 can be reduced. As a result, interference when the wound electrode body 40 is inserted into the exterior body 52 can be more appropriately prevented. Also, unlike FIG. 4, only the positive electrode terminating end portion may be disposed on the first stacked portion side (the front side in the depth direction). Also in this case, the width dimension of the wound electrode body can be reduced, and the interference between the wound electrode body and the exterior body can be prevented.

Also, a ratio of a length w2 in the width direction X of the electrode starting end stacked portion 48 to a total length w1 in the width direction X of the flat portion 40f (w2/w1) is preferably 0.5% or more, more preferably 3% or more, still more preferably 5% or more, and particularly preferably 7% or more. By ensuring that the length w2 of the electrode starting end stacked portion 48 is equal to or greater than a certain value, it is possible to prevent the third region 29 from sliding down toward the folded portion 28 side and the electrode starting end stacked portion 48 from disappearing when the flat portion 40f is pressed. On the other hand, w2/w1 is preferably 20% or less, more preferably 15% or less, even more preferably 13% or less, and particularly preferably 12% or less. Thus, it is possible to inhibit occurrence of the local pressing failure caused by narrowing of the flat portion 40f excluding the electrode starting end stacked portion 48.

Also, a specific dimension of the length w2 of the electrode starting end stacked portion 48 is preferably 100 mm to 300 mm and more preferably 125 mm to 135 mm. On the other hand, a specific dimension of the total length w1 of the flat portion 40f is preferably 1 mm to 20 mm and particularly preferably 1 mm to 15 mm. In addition, a thickness (dimension in the depth direction Y) of the wound electrode body 40 is preferably 8 mm to 30 mm and particularly preferably 10 mm to 15 mm. Further, a height (dimension in the height direction Z) of the wound electrode body 40 is preferably 40 mm to 135 mm and particularly preferably 55 mm to 100 mm. The technique disclosed herein can be appropriately applied to the wound electrode body having the dimensions described above.

Other Embodiments

One embodiment of the technique disclosed herein has been described above. Also, the above-described embodiment shows an example to which the technique disclosed herein is applied and does not limit the technique disclosed herein. Other embodiments of the technique disclosed herein will be described below.

(1) Number of Wound Electrode Bodies

For example, in the secondary battery 100 according to the above-described embodiment, one wound electrode body 40 is housed inside the battery case 50. However, the number of electrode bodies housed in one battery case is not particularly limited and may be two or more (plural). Further, in a secondary battery including a plurality of wound electrode bodies, when the amount of heat generated becomes non-uniform, there is a risk that the heat generation distribution inside the battery will be significantly uneven due to mutual heating between the plurality of wound electrode bodies. In this case, the precipitation of metal Li due to the local deterioration of the electrode plates may be further promoted. On the other hand, according to the technique disclosed herein, the amount of heat generated of each of the plurality of wound electrode bodies can be made uniform. For this reason, the technique disclosed herein can be appropriately applied to secondary batteries having a plurality of wound electrode bodies.

(2) Capacity of Secondary Battery

Further, in order to construct a high-capacity secondary battery, it is required to increase a filling density of a positive electrode active material layer that releases charge carriers during charging and increase positive electrode capacity. However, when a high-density positive electrode active material layer is formed, a ratio of $Li^+$ capacity of the negative electrode plate to $Li^+$ capacity of the positive electrode plate (opposite capacity ratio: negative electrode capacity/positive electrode capacity) decreases, and thus the metallic lithium tends to precipitate on the negative electrode plate side. On the other hand, according to the technique disclosed herein, the Li precipitation resistance can be improved due to the improvement in structural perspective of adjusting the arrangement positions of end portions of the positive electrode plate and the negative electrode plate. For this reason, it is possible to realize a higher density of the positive electrode active material layer, which was difficult from the viewpoint of the Li precipitation resistance, and to contribute to higher capacity of the secondary battery. For example, according to the technique disclosed herein, even in a case in which a wound electrode body having a filling density of the positive electrode active material layer of 3.4 g/cc or more (for example, 3.5 g/cc), and an opposite capacity ratio of 1.1 or less (for example, 1.08) is used, the precipitation of metal Li can be appropriately inhibited.

(3) Positions of End Portions of Separators

Figure 5:
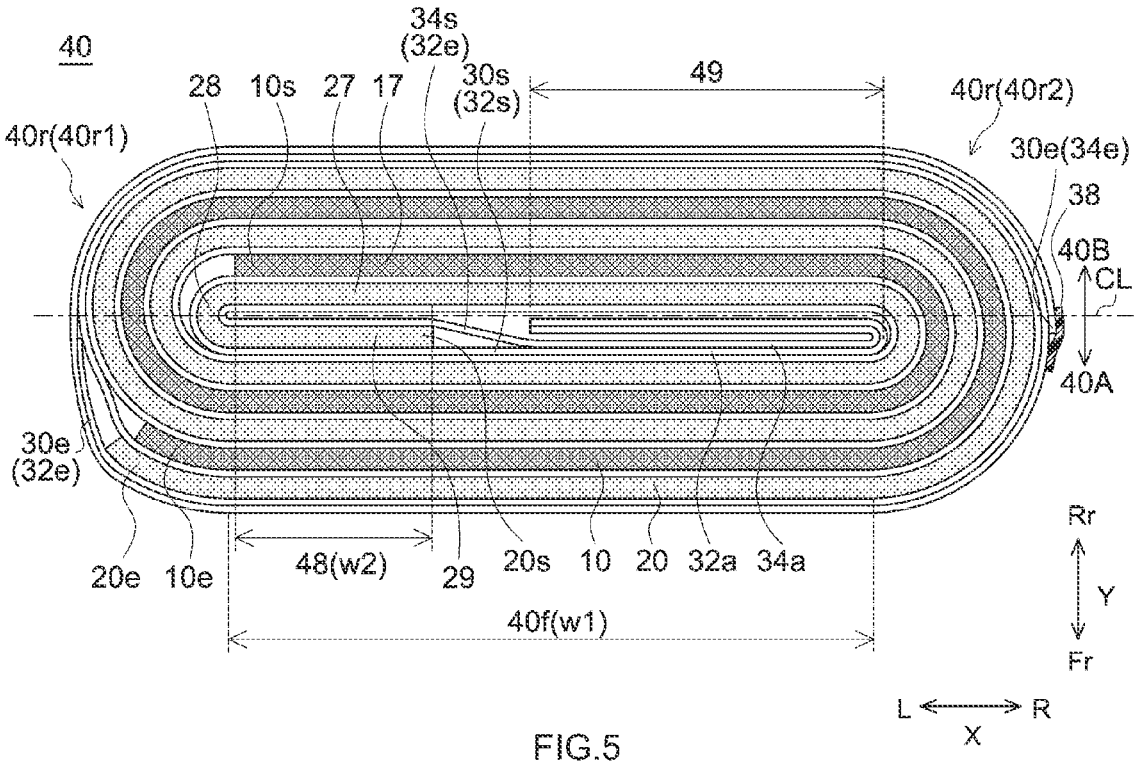
FIG. 5 is a cross-sectional view of a wound electrode body according to another embodiment.

As shown in FIG. 4, in the secondary battery 100 according to the above-described embodiment, the positive electrode starting end portion 10s, the negative electrode starting end portion 20s, the positive electrode terminating end portion 10e, and the negative electrode terminating end portion 20e are respectively disposed at predetermined positions. Thus, the precipitation of metal Li can be inhibited. Here, in order to inhibit the precipitation of metal Li more appropriately, arrangement positions of the end portions of the separators are also preferably adjusted in addition to those of the positive electrode plate and the negative electrode plate. An embodiment in which the arrangement positions of the end portions of the separators are changed will be described with reference to FIG. 5. FIG. 5 is a schematic cross-sectional view of a wound electrode body of a secondary battery according to another embodiment.

(a) Starting End Portions of Separators

In this embodiment, as shown in FIG. 5, starting end portions 30s of the two separators 30 extend from the negative electrode starting end portion 20s. Specifically, the starting end portion (a first starting end portion 32s) of the first separator 32 has a first extending portion 32a extending from the negative electrode starting end portion 20s. Similarly, the starting end portion (a second starting end portion

34s) of the second separator 34 has a second extending portion 34a extending from the negative electrode starting end portion 20s. According to such a configuration, a difference in thickness between the electrode starting end stacked portion 48 and a region therearound can be reduced due to thicknesses of the first extending portion 32a and the second extending portion 34a. Thus, the surface pressure distribution in the flat portion 40f can be made more uniform, and the precipitation of metallic lithium can be inhibited more appropriately.

In addition, in the embodiment shown in FIG. 5, each of the first extending portion 32a of the first separator 32 and the second extending portion 34a of the second separator 34 is folded back along the second curved portion 40r2. Thus, a separator stacked portion 49 in which only the first separator 32 and the second separator 34 are stacked is formed inside the flat portion 40f excluding the electrode starting end stacked portion 48. Thus, thicknesses of the electrode starting end stacked portion 48 and the flat portion 40f excluding the electrode starting end stacked portion 48 can be further approximated. As a result, the surface pressure distribution in the flat portion 40f can be made more uniform, and the Li precipitation resistance can be further improved. Also, it is preferable that the number of layers of the separators 30 in the separator stacked portion 49 be appropriately adjusted in consideration of the thickness of the negative electrode plate 20 (third region 29) and thicknesses of the separators 30. Specifically, in the wound electrode body 40 before being pressed, it is preferable to adjust the number of layers of the separators 30 so that the separator stacked portion 49 is slightly thicker than the third region 29. As an example, in the separator stacked portion 49, it is preferable that the first separator 32 be stacked in three or more layers and the second separator be stacked in two or more layers. Thus, when the wound electrode body 40 is pressed, the separator stacked portion 49 is deformed to be crushed, and thus the thicknesses of the electrode starting end stacked portion 48 and the flat portion 40f excluding the electrode starting end stacked portion 48 can be more appropriately approximated.

(b) Terminating End Portions of Separators

Further, in the above-described embodiment, as shown in FIG. 4, the terminating end portions 30e of the separators 30 and the winding stop tape 38 are disposed on the first curved portion 40r1. However, the position at which the terminating end portions 30e of the separators 30 and the winding stop tape 38 are disposed is not limited to the first curved portion 40r1. For example, as shown in FIG. 5, a first terminating end portion 32e of the first separator 32 may be disposed on the first curved portion 40r1, and a second terminating end portion 34e of the second separator 34 and the winding stop tape 38 may be disposed on the second curved portion 40r2. In the case of adopting such a configuration, the pressure distribution in the flat portion 40f can also be made uniform, and thus the precipitation of metallic lithium can be inhibited.

(4) Number of Layers of Electrode Plates

As described above, according to the technique disclosed herein, the total number of layers of the electrode plates (the positive electrode plate and the negative electrode plate) can be the same between the first stacked portion and the second stacked portion that sandwich the center line. In this case, the total number of layers of the electrode plates in each of the first stacked portion and the second stacked portion is preferably 40 or more, more preferably 50 or more, and particularly preferably 60 or more. Battery performance tends to improve as the total number of layers of the electrode plates increases. On the other hand, the technique disclosed here can be particularly suitably applied to a wound electrode body in which the total number of layers of electrode plates (number of windings) is small. Specifically, in a wound electrode body with a small number of layers, an amount of heat generated in each region tends to differ by differing the numbers of layers of electrode plates even by one layer between the first stacked portion and the second stacked portion. On the other hand, the technique disclosed here can make the numbers of layers in the first stacked portion and the second stacked portion the same. For this reason, it is possible to appropriately prevent non-uniformity in the amount of heat generated in the wound electrode body having a small number of layers. From this point of view, the total number of layers of the positive electrode plate and the negative electrode plate in each of the first stacked portion and the second stacked portion is preferably 300 or less and particularly preferably 200 or less.

TEST EXAMPLES

Test examples relating to the present disclosure will be described below. Also, the test examples described below are not intended to limit the present disclosure.
1. Production of Each Sample
In the present test, two types of wound electrode bodies having different arrangement positions of the positive electrode starting end portion, the negative electrode starting end portion, the positive electrode terminating end portion, and the negative electrode terminating end portion were produced. Each sample will be specifically described below.
(1) Sample 1
In the present test, a stacked body in which a positive electrode plate and a negative electrode plate were stacked via two separators was prepared. Then, the stacked body was wound and then press-molded, thereby producing a flat-shaped wound electrode body. In addition, the positive electrode plate was prepared by applying a positive electrode active material layer (having a thickness of each layer of 63 μm, a total thickness of 126 μm, and a dimension of 75 mm in the height direction) on both surfaces of a positive electrode core body (aluminum foil having a thickness of 13 μm). The positive electrode active material layer contains a positive electrode active material, a conductive material, and a binder in a ratio of 97.5:1.5:1.0. Also, a lithium nickel cobalt manganese composite oxide (NCM) was used for the positive electrode active material. Further, acetylene black (AB) was used for the conductive material. In addition, polyvinylidene fluoride (PVdF) was used for the binder. On the other hand, the negative electrode plate in which a negative electrode active material layer (having a thickness of each layer of 76 μm, a total thickness of 152 μm, and a dimension of 79 mm in the height direction) was applied on both surfaces of a negative electrode core body (copper foil having a thickness of 8 μm) was used. The negative electrode active material layer of the negative electrode plate contains a negative electrode active material, a thickener, and a binder in a ratio of 98.3:0.7:1.0. Further, graphite was used for the negative electrode active material, carboxymethyl cellulose (CMC) was used for the thickener, and styrene butadiene rubber (SBR) was used for the binder. Next, for the separator, one in which a heat-resistant layer containing alumina powder and polyvinylidene fluoride (PVdF) was formed on a surface of a resin base material layer made of polyethylene (PE) was used.
Here, in Sample 1, the arrangement positions of the positive electrode plate 10 and the negative electrode plate 20 were adjusted such that the wound electrode body 40 having the configuration shown in FIG. 4 was produced. Specifically, stacked positions of the positive electrode plate 10 and the negative electrode plate 20 in the length direction were adjusted such that the negative electrode starting end portion 20s protrudes from the positive electrode starting end portion 10s. Then, the protruded negative electrode starting end portion 20s was bent such that a tip portion (corresponding to the third region 29) of the negative electrode plate 20 overlaps the positive electrode starting end portion 10s. Then, the positive electrode plate 10 and the negative electrode plate 20 were wound 17 times with the separators 30 interposed therebetween. After that, the positive electrode terminating end portion 10e and the negative electrode terminating end portion 20e were disposed outside the position at which the negative electrode starting end portion 20s was bent. Then, press-molding is performed such that the arrangement positions of the positive electrode terminating end portion 10e and the negative electrode terminating end portion 20e become the first curved portion 40r1. Thus, the electrode starting end stacked portion 48 in which the first region 17, the second region 27, and the third region 29 overlap each other is formed in a part of the flat portion 40f, and the wound electrode body 40 in which the positive electrode terminating end portion 10e and the negative electrode terminating end portion 20e were disposed on the first curved portion 40r1 was produced. In the wound electrode body 40, the number of layers of each of the positive electrode plate 10 and the negative electrode plate 20 in the first stacked portion 40A was 17 layers. In addition, the number of layers of each of the positive electrode plate 10 and the negative electrode plate 20 in the second stacked portion 40B was 17 layers.
Next, the positive electrode tab group 42 of the wound electrode body 40 produced as described above was connected to the positive electrode terminal 60, and the negative electrode tab group 44 was connected to the negative electrode terminal 70. Then, the wound electrode body 40 was housed in the battery case 50. After that, the non-aqueous electrolyte solution was injected into the battery case 50. Then, a lithium ion secondary battery for evaluation test was constructed by sealing the battery case 50. In addition, in the present test, for the non-aqueous electrolyte solution, one in which a supporting salt ($LiPF_6$) was contained at a concentration of about 1 mol/L in a mixed solvent containing ethylene carbonate (EC), dimethyl carbonate (DMC), and ethyl methyl carbonate (EMC) at a volume ratio of 3:4:3 was used.
(2) Sample 2
In Sample 2, a lithium ion secondary battery for evaluation test was produced under the same conditions as in Sample 1, except that arrangement positions of the positive electrode plate and the negative electrode plate were changed when the wound electrode body was produced. Specifically, in Sample 2, the arrangement positions of the positive electrode plate 110 and the negative electrode plate 120 were adjusted as follows such that the wound electrode body 140 having the configuration shown in FIG. 6 was produced. First, the stacked positions of the positive electrode plate 110 and the negative electrode plate 120 in the length direction were adjusted such that the positive electrode starting end portion 110s and the negative electrode starting end portion 120s were aligned with each other. Then, the positive electrode plate 110 and the negative electrode plate 120 were wound 17 times while the separator are interposed. After that, the positive electrode terminating end portion 110e and the negative electrode terminating end portion 120*e* were disposed on a side opposite to the positions at which the positive electrode starting end portion 110*s* and the negative electrode starting end portion 120*s* were disposed. Then, press-molding was performed so that the positions at which the positive electrode starting end portion 110*s* and the negative electrode starting end portion 120*s* were disposed became the first curved portion 140*r*1. Then, upon confirming the wound electrode body 140 after production, the positive electrode starting end portion 110*s* and the negative electrode starting end portion 120*s* are displaced due to the tension during winding or press-molding, and the layer-deficient region 141 was formed in the flat portion 140*f* near the first curved portion 40*r*1. Then, in the wound electrode body 140 of Sample 2, the positive electrode terminating end portion 110*e* and the negative electrode terminating end portion 120*e* were disposed on the second curved portion 140*r*2. In the wound electrode body 140, the number of layers of each of the positive electrode plate 110 and the negative electrode plate 120 in the first stacked portion 140A was 17 layers. In addition, the number of layers of each of the positive electrode plate 110 and the negative electrode plate 120 in the second stacked portion 140B was 18 layers.

2. Evaluation Test (1) Evaluation of Pressure Distribution

In the present evaluation, a surface pressure distribution when the flat portion of the wound electrode body of each a voltage V1 when a current of 50 A was applied for 10 seconds, a voltage V2 when a current of 75 A was applied for 10 seconds, a voltage V3 when a current of 100 A was applied for 10 seconds, a voltage V4 when a current of 150 A was applied for 10 seconds, and a voltage V5 when a current of 200 A was applied for 10 seconds were measured. Next, battery resistance was obtained on the basis of each applied current value and the gradient of the voltages V1 to V5 after 10 seconds. Then, a "resistance value per layer" was calculated by dividing the calculated battery resistance by the total number of layers of the positive electrode plate (34 layers). Next, a resistance value of the first stacked portion of each sample was calculated by multiplying the "resistance value per layer" obtained for the reference battery by the number of layers of the first stacked portion of each sample. Similarly, the resistance value of the second stacked portion was calculated by multiplying the "resistance value per layer" obtained for the reference battery by the number of layers of the second stacked portion of each sample. Then, it is assumed that a direct current of 300 A is applied to the lithium ion secondary battery of each sample, the amount of heat generated in each of the first stacked portion and the second stacked portion was calculated on the basis of the following formula (1). Table 1 shows the results.

$$\text{Amount of heat generation } (J) = \text{current value } (A) \times \text{current value } (A) \times \text{resistance value}(\Omega) \tag{1}$$

TABLE 1

| | Structure of electrode body | | | | Temperature distribution evaluation | | | | |
|---|---|---|---|---|---|---|---|---|---|
| | | Number of layers of positive electrode plate | | Pressure distribution evaluation | Resistance value (Ω) | | Amount of heat generation (J) | | Ratio of amount of heat generation |
| | Electrode starting end stacked portion | Arrangement positions of terminating end portions | Rear portion | Front portion | Unpressed region | Rear portion | Front portion | Rear portion | Front portion | (Front portion/ Rear portion) |
| Sample 1 | Present | First curved portion | 17 | 17 | Absent | 5.00E−04 | 5.00E−04 | 45.0 | 45.0 | 0 |
| Sample 2 | Absent | Second curved portion | 18 | 17 | Present | 5.30E−04 | 5.10E−04 | 47.6 | 46.3 | Increased by 2.8% | sample was pressed was investigated. Specifically, first, a pair of pressure-sensitive papers (manufactured by Fuji Film Co., Ltd.) were attached to sandwich the flat portion of the wound electrode body, which is a test target. Then, using a pressing jig having a flat pressing surface, pressing was performed to sandwich the flat portion of the wound electrode body. A pressure in this case was set to 2 kN, and a pressing time was set to 60 seconds. After that, the pressure-sensitive papers were removed from the wound electrode body, and discolored portions (pressed portions) of the pressed papers were visually observed. Table 1 shows the results.

(2) Temperature Distribution Evaluation

In the present evaluation, resistance values of the first stacked portion and the second stacked portion of the wound electrode body of each sample were measured, and the temperature distribution during charging and discharging was calculated on the basis of the resistance values. Specifically, in the present evaluation, first, a reference battery in which the total number of layers of the positive electrode plate was 34 layers was constructed. This reference batten uses the same material as the lithium ion secondary batteries of Samples 1 and 2 above. Then, this reference battery was connected to a charging and discharging power supply, and (3) Test Results First, as shown in Table 1, as a result of performing the pressure distribution evaluation, in Sample 2, it was confirmed that there was an unpressed region that was hardly discolored (no pressure was applied) in the pressure-sensitive paper after the test. In addition, the unpressed region was generated at a position corresponding to the layer-deficient region 141. On the other hand, in the surface pressure distribution evaluation of Sample 1, sufficient pressure was applied to the entire flat portion, and no unpressed region like Sample 2 was generated. From the above results, it was found that the arrangement positions of the positive electrode starting end portion 10*s* and the negative electrode starting end portion 20*s* were adjusted such that the electrode starting end stacked portion 48 in which the first region 17 of the positive electrode plate 10, the second region 27 of the negative electrode plate 20, and the third region 29 of the negative electrode plate 20 overlap each other was formed, and thus the precipitation of metal Li caused by the local pressing failure can be inhibited.

Next, as shown in Table 1, in the temperature distribution evaluation, the result was that the second stacked portion 140B (rear portion) of Sample 2 had a higher resistance value than the first stacked portion 140A (front portion) and easily generated heat. On the other hand, in Sample 1, the result was that the resistance values of the first stacked portion 40A (front portion) and the second stacked portion 40B (rear portion) were the same, and the susceptibility to heat generation was approximately the same. From the above results, it is understood that, when the positive electrode terminating end portion 10e and the negative electrode terminating end portion 20e are disposed outside the first curved portion 40r1 adjacent to the positive electrode starting end portion 10s and the negative electrode starting end portion 20s, the number of layers of the electrode plates in the first stacked portion 40A and the second stacked portion 40B are the same, and thus it is possible to inhibit the precipitation of metal Li due to the non-uniform heat generation distribution.

While the present disclosure has been described in detail above, the above description is merely exemplary. That is, the technique disclosed herein includes various modifications and changes of the above-described specific examples.

What is claim is:

1. A secondary battery comprising:
a flat wound electrode body in which a positive electrode plate and a negative electrode plate are wound via a separator; and
a battery case configured to house the wound electrode body, wherein
the flat wound electrode body includes a pair of curved portions having curved outer surfaces and a flat portion having a flat outer surface connecting the pair of curved portions to each other,
one end portion of the positive electrode plate in a longitudinal direction thereof is disposed inside the wound electrode body as a positive electrode starting end portion, and the other end portion is disposed outside the wound electrode body as a positive electrode terminating end portion,
one end portion of the negative electrode plate in a longitudinal direction thereof is disposed inside the wound electrode body as a negative electrode starting end portion, and the other end portion is disposed outside the wound electrode body as a negative electrode terminating end portion,
the positive electrode starting end portion includes a first region extending along the flat portion,
the negative electrode starting end portion includes:
a second region extending along the flat portion;
a folded portion folded back from an end portion of the second region along a first curved portion, which is one of the pair of curved portions; and
a third region extending from an end portion of the folded portion along the flat portion to a distal end of the negative electrode starting end portion, an electrode starting end stacked portion in which the first region, the second region, and the third region overlap each other in the order of the first region overlapping the second region and the second region overlapping the third region in a thickness direction thereof, with the electrode starting end stacked portion being formed in a part of the flat portion, and
the positive electrode terminating end portion and the negative electrode terminating end portion are disposed in the first curved portion.

2. The secondary battery according to claim 1, wherein a terminating end portion of the separator is disposed on an outermost side of any one of the pair of curved portions and is attached to the outermost side of the curved portion with a winding stop tape.

3. The secondary battery according to claim 1, wherein only the separator is wound around an outermost circumference of the wound electrode body in one or more turns.

4. The secondary battery according to claim 1, wherein a ratio (w2/w1) of a length w2 in a width direction of the electrode starting end stacked portion to the total length w1 in a width direction of the flat portion is 0.5% or more and 20% or less.

5. The secondary battery according to claim 1,
wherein the flat portion is divided into a first stacked portion and a second stacked portion, which sandwich a center line extending along the third region, and
the total number of layers of the positive electrode plate and the negative electrode plate in each of the first stacked portion and the second stacked portion is 40 or more and 200 or less.

6. The secondary battery according to claim 1, wherein the wound electrode body is produced by winding a stacked body in which a first separator, the negative electrode plate, a second separator, and the positive electrode plate are stacked in order.

7. The secondary battery according to claim 6, wherein a first extending portion extending from the negative electrode starting end portion is formed at one end portion of the first separator in a longitudinal direction, and a second extending portion extending from the negative electrode starting end portion is formed at one end portion of the second separator in a longitudinal direction.

8. The secondary battery according to claim 7, wherein each of the first extending portion and the second extending portion is folded back along a second curved portion, which is the other of the pair of curved portions, to form a separator stacked portion in which only the first separator and the second separator are stacked.

9. The secondary battery according to claim 6, wherein an adhesive layer is provided on a surface of at least one of the first separator and the second separator.

* * * * *